Feb. 24, 1942.  M. W. FREEMAN  2,274,599
SOUND CONTROL
Filed Aug. 1, 1940  3 Sheets-Sheet 1

INVENTOR.
MICHAEL W. FREEMAN
BY Whittemore, Hulbert
Belknap ATTORNEYS

Feb. 24, 1942.   M. W. FREEMAN   2,274,599
SOUND CONTROL
Filed Aug. 1, 1940   3 Sheets-Sheet 2
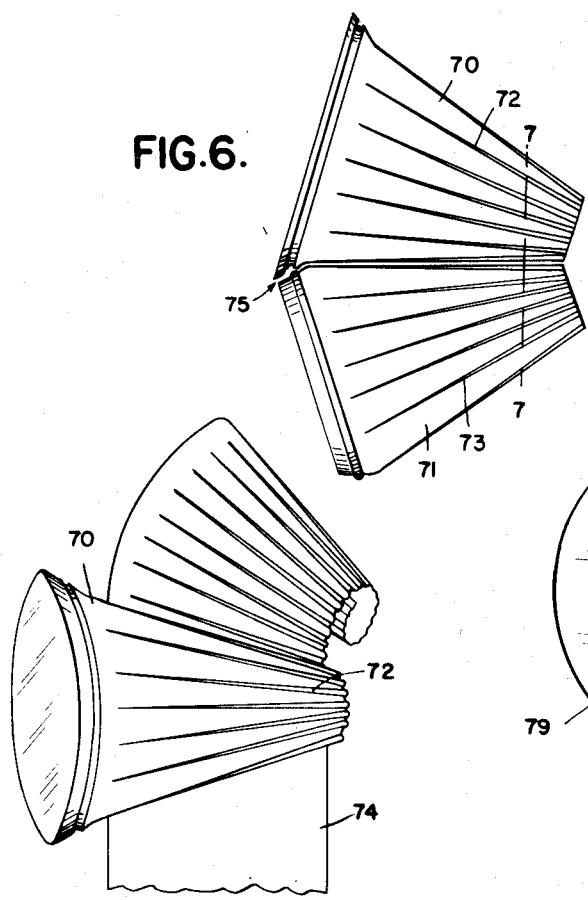
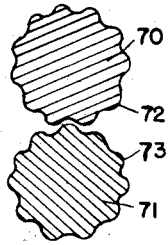
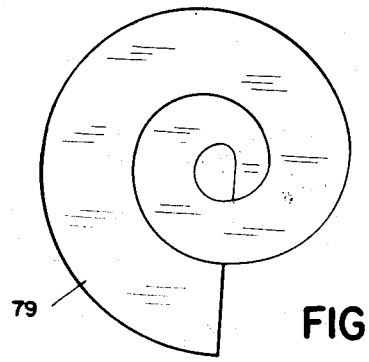
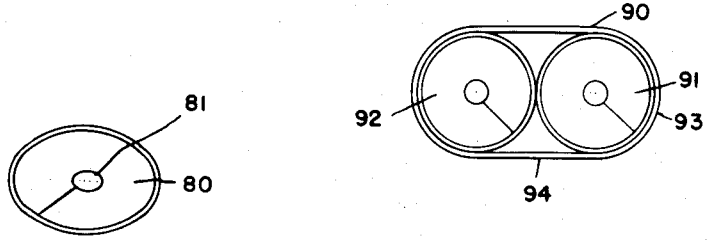
FIG.6.   FIG.7.   FIG.8.   FIG.9.   FIG.10.   FIG.11.
*INVENTOR.*
MICHAEL W. FREEMAN
BY Whittemore, Hulbert
& Belknap   ATTORNEYS Feb. 24, 1942.   M. W. FREEMAN   2,274,599
SOUND CONTROL
Filed Aug. 1, 1940   3 Sheets-Sheet 3

INVENTOR.
MICHAEL W. FREEMAN
BY Whittemore, Hulbert
& Belknap   ATTORNEYS

Patented Feb. 24, 1942

2,274,599

UNITED STATES PATENT OFFICE 2,274,599

SOUND CONTROL

Michael W. Freeman, Detroit, Mich.

Application August 1, 1940, Serial No. 349,111

16 Claims. (Cl. 181—47)

The present invention relates to sound control apparatus adapted to muffle or silence the explosive sound of gas emission under various temperature, pressure and velocity conditions. The problem is to silence or muffle the exhaust of combustion engines or the explosive sound of fire arms or the like.

According to the present invention, briefly described, the gas, under the various temperature, pressure and velocity conditions aforesaid, is directed into the concave end of a helicoidally formed body provided by a strip wound generally in a helix-like form and having its transverse surfaces inclined at a substantial angle to the axis of the helicoid. This baffle member is enclosed in a casing, in some cases this strip having portions forming an external envelope for the helicoid.

The operation of my improved sound control apparatus apparently depends for its demonstrated effectiveness upon the fact that the gases, under the temperature, pressure and velocity conditions aforesaid, are directed into a swirling path, some of the energy derived from the pressure condition being transformed into velocity due to expansion of the gas; and this, in turn, functions to reduce pressure in a controlled manner. The result of this is low back-pressure as compared to the amount of pressure produced by previous devices of this type, and a more uniform and constant, i. e., less pulsating, exhaust of the gases from the apparatus. The mode of presenting the generally helicoidal member enables the gases to flow out in a more constant manner.

In the event that the article is employed as a muffler for a combustion engine, the low back-pressure, which is one of the characteristics of the present invention, is useful in increasing the performance of the engine, and at the same time the apparatus operates in an extremely efficient manner to minimize the sound of the exhaust.

It is accordingly an object of the present invention to provide sound control apparatus as aforesaid.

It is a further object of the invention to increase the engine efficiency by producing a satisfactory sound dampening device operable to control the sound of the exhaust while keeping back-pressure at a minimum by modifying certain characteristics of the device in a definite manner.

It is a further object of the invention to provide improved methods of manufacturing the apparatus.

It is a further object of the present invention to provide for economical manufacturing of the improved apparatus by the hereinafter described novel methods of manufacture.

Other objects of the invention will be apparent as the description proceeds and when taken in conjunction with the accompanying drawings, wherein:

Figure 6 is a diagrammatic elevation illustrating apparatus useful in the production of my improved baffle member;

Figure 7 is a section on the line 7—7, Figure 6;

Figure 8 is a diagrammatic plan view of the apparatus shown in Figure 6;

Figure 9 is a diagrammatic view illustrating another method of making my improved baffle member;

Figure 10 is an end projection of a modified form of baffle; and

Figure 11 is an end projection showing the relationship of a pair of baffles in a single casing;

For simplicity, I have chosen to illustrate my invention as applied to a muffler of the type employed in combustion engines and, more particularly, in motor vehicles. It will be understood that this illustration or description is exemplary only and is not intended to limit the application of the principles herein taught. It will be understood that these principles may find utility in widely divergent fields, the use of so-called "silencers" on fire arms being a second example.

Figure 1:
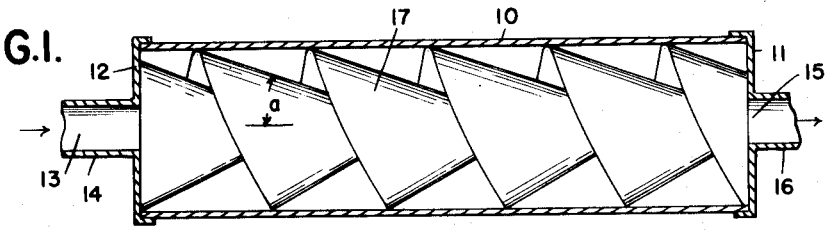
Figure 1 is a side elevation of a muffler which embodies the present invention, partly in section.

With this explanation, in Figure 1 I have illustrated a muffler comprising a casing, 10, having end closure plates, 11 and 12. The closure plate 12, is at the inlet end of the muffler, as indicated by the arrow, and is provided with an opening, 13, for the admission of gases under pressure and velocity conditions to the interior of the casing, 10; the opening, 13, is surrounded by a flange, 14, for coupling to the exhaust from a motor.

The end closure, 11, is likewise provided with an exhaust opening, 15, also surrounded by a flange, 16, for suitable coupling to an exhaust pipe if desired. While I have shown the flanges defining inlet and outlet openings as centered with respect to the casing, it will be understood that they may, if desired, be placed eccentrically thereto.

Within the casing, 10, is a generally helicoidal baffle, 17. This baffle is formed by twisting or coiling a strip or ribbon of metal in a generally helicoidal path so that the transverse surface of the ribbon or strip extends at a substantial angle to the axis of the helicoid.

In some cases, it is desirable to stabilize the free inner edge of the baffle, by folding it, doubling it, or otherwise reinforcing it.

Certain principles governing the precise shape of the baffle may be discussed. Generally, I have found that the inclination of the transverse surfaces of the strip should preferably be such as to form an angle of between 15° and 75° with the axis of the helicoid, and this angle is indicated at $a$ in Figure 1.

It is ordinarily desirable, but not necessary, that the spacing of adjacent convolutions should be such, with relation to the inclination of the transverse surfaces thereof, that adjacent generally helicoidal surfaces overlap in planes perpendicular to the axis of the helicoid, as clearly indicated in Figure 1.

While the specific design of the helicoidal baffle depends, as will be obvious, upon the specific pressure and velocity conditions of the gas which it is to control, it may be stated in general that preferably the inclination of adjacent convolutions should vary from end to end of the baffle. When high pressure conditions are encountered, it is ordinarily preferable to provide the generally helicoidal baffle with steeper initial angles and with gradually decreasing inclination. In other words, the first convolution will be arranged so that its transverse surface extends at a greater angle to the axis of the helicoid than do the succeeding convolutions. Under low pressure conditions it is ordinarily preferable to provide the generally helicoidal surfaces at a less steep initial angle of inclination, and with succeeding convolutions extending at still lesser angles. It should be noted that this device may be designed to follow a true helicoidal path, and mufflers embodying this were tested under practical conditions with excellent results. Therefore, while the pitch of the convolutions may be varied if desired, this device may be designed without such variations.

Figure 2:
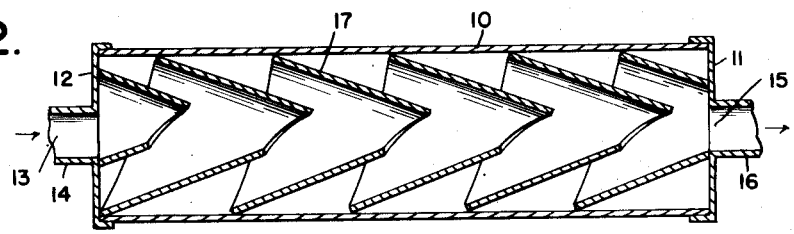
Figure 2 is a longitudinal section of a muffler embodying the present invention.
Figure 3:
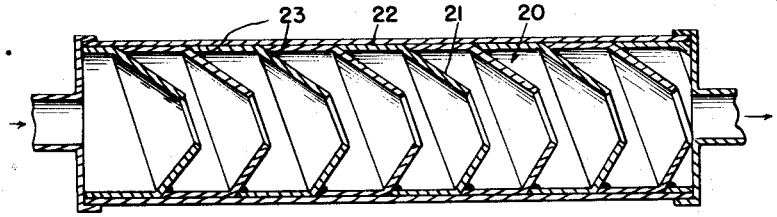
Figure 3 is a detailed fragmentary sectional view of a baffle illustrating one embodiment of my invention.

In Figures 1 and 2, I have indicated the helicoidal baffle, 17, as merely nested within a cylindrical housing, 10. In Figure 3, I have indicated a somewhat different embodiment in which the baffle 20, has helicoidal convolutions, 21, of the type illustrated in Figures 1 and 2, and each convolution, 21, is provided with a flange, 22, which is adapted to abut the preceding convolution in a manner to provide an envelope for the helicoidal baffle. The junction between the flanges, 22, and the convolutions, 21, may be welded, as indicated at 23, so as to provide a sealing envelope. The baffle, when constructed in accordance with the foregoing, may then be slipped in place within a cylindrical casing, such as 10, and welded or otherwise permanently secured thereto. If it is so desired, this, in turn may be placed within another casing, which would provide additional sound-proofing among other things.

Figure 4:
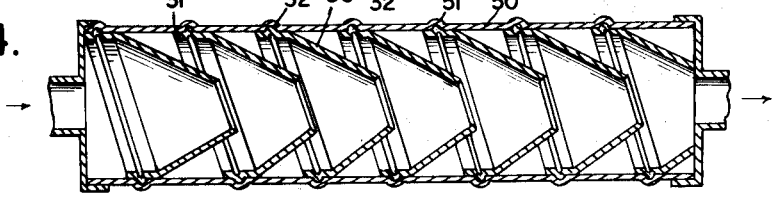
Figure 4 is a detailed fragmentary sectional view of a somewhat modified form of baffle member.

In some cases, I prefer to provide the helicoidal member as shown in Figure 4. In this figure the helicoidal convolution is shown in section at 30 and is provided with a flange, 31, which, in turn, is provided with a bead, 32. Said bead may terminate as shown in 32, or as in Figures 18—32' and 19—32". This may conveniently be provided simultaneously with the formation of a strip of metal into the helicoidal form, as is indicated in Figure 6. In this embodiment of the invention the casing, 50, which is generally similar to the casing 10, is provided with a wall formation which, in turn, provides a thread-like structure, 51, with variable pitch, if so desired. The thread-like structure, 51, provides internal threads, 52, for the reception of the bead, 32, as indicated in the figure.

It will be evident that the helicoidal baffle, 30, may then be threaded into position within the casing, 50, to assemble the baffle within the casing. The thread-like formation, 51, may be formed so as to have a definite pitch, variable if desired, and further may be discontinuous. The helicoidal member, 30, may then be threaded therein, with the result that adjacent convolutions will have a predetermined spacing corresponding to the spacing of the thread-like formation, 51. After the helicoidal baffle has been threaded into position within the casing, it may be welded or otherwise fastened as by crimping in position as desired.

Figure 5:
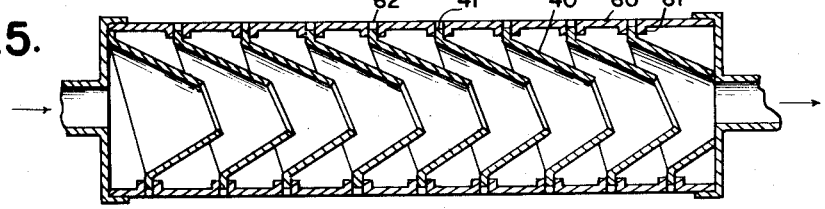
Figure 5 is a fragmentary sectional view of yet another embodiment of my improved baffle member.

In Figure 5, I have illustrated a somewhat different embodiment of my invention in which a helicoidal baffle, 40, is provided with radially outturned flanges, 41. At the same time the casing indicated in this figure at 60 has portions, 61, bent inwardly to provide opening, 62, therebetween. It will be appreciated that the portions, 61, will be provided in pairs at spaced points along a path in a manner to receive the flange, 41, of the baffle member, 40, as indicated. The path along which portions, 61, are provided, may, if desired, as explained in connection with Figure 4, have a variable pitch.

As in the construction illustrated in Figure 4, the baffle member may then be threaded into position within the casing, 60, after which it may, if desired, be welded or otherwise fastened to provide a permanent interlock.

The thread-like arrangement may also be accomplished by preforming it and to secure same along a predetermined path to the preformed or formed casing, or instead to the helicoidal member if so desired.

In either event, it is ordinarily desirable, after assembly of the helicoidal baffle within the casing, to securely lock the same therein by welding or other means. In case of welding it may conveniently take the form of continuous welding or spot welding along suitably spaced points along the interfitting paths of the casing and the helicoidal member.

In order to manufacture the helicoidal baffle economically, it is possible to form continuous straight sheet metal into helicoidal form. To accomplish this, I provide a pair of cooperating rolls, 70 and 71, as indicated in Figures 6 and 7, these rolls being frusto-conical and having co-operating corrugations indicated at 72 and 73, respectively. The corrugations, 72 and 73, are of increasing amplitude toward the small end of the frusto-conical rolls, 70 and 71. Preferably, although not necessarily, these matching corrugations "die out" or do not extend completely to the large end of the rolls.

In Figure 8, I have indicated a strip of sheet metal, 74, as passing between rolls, 70 and 71, and emerging in a coil as shown. The metal may be employed either in corrugated form or, if preferred, it may be modified by again passing it between a pair of rolls of different corrugations or smooth surfaces to conform with a predetermined change of plane of the former corrugations to fold down or smooth out the corrugations without changing materially the over-all shape of the formed strip.

Figure 20:
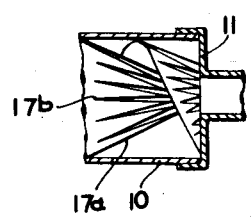
Figure 20 is a fragmentary section of a modified embodiment.

In Figure 20 I have shown a portion of a muffler employing a corrugated baffle. In this figure the cylindrical casing, 10, like that shown in Figure 1, has an outlet closure, 11, and the generally helicoidal baffle, 17a, is shown as having corrugation, 17b, such as result from the operations illustrated in Figure 8.

Figure 18:
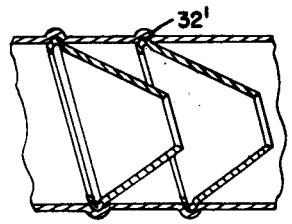
Figures 18 and 19 are further modifications of baffles.
Figure 19:
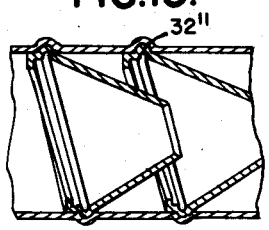

While the strip material is being passed between the rolls 70 and 71, it may be convenient to form the same with the flange, 31, and the bead, 32, 32', 32", as illustrated in Figures 4, 18 and 19, or the flange, 41, as illustrated in Figure 5, by suitably forming the rolls 70 and 71. An arrangement which is suitable for forming the flange, 31, is indicated at 75 in Figure 6, formation of beads 32, 32', 32" may be incorporated therein. If preferred, the beads or flanges may, of course, be formed independently.

Figure 17:
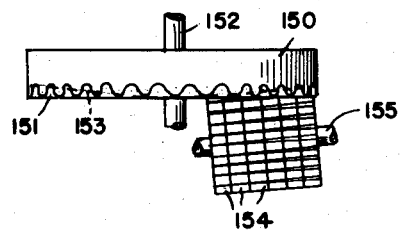
Figure 17 is a diagrammatic view illustrating modified apparatus for forming a baffle from straight strip material.

A somewhat modified form of apparatus for forming the helicoidal baffle member from straight strip material is indicated in Figure 17, in which a member having corrugations, 151, on one surface thereof is mounted for rotation on a spindle, 152. The corrugations are of increasing depth as measured radially outward from the axis of member 150, as indicated by the dotted lines, 153. Cooperating with said member 150 are a plurality of gears, 154, mounted for independent rotation on a shaft, 155. Each gear, 154, has corrugations or teeth corresponding to the portions of the corrugations, 151, with which they contact. The strip material is fed through in an obvious manner and merges with corrugations of increasing depth toward one edge.

Figure 13:
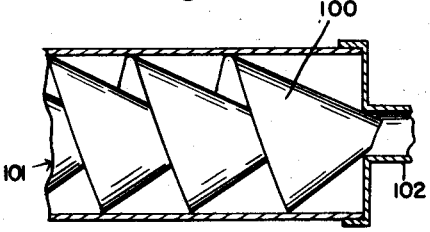
Figure 13 is a fragmentary elevation, partly in section illustrating a modified construction.

In Figure 13 I have illustrated a somewhat modified arrangement, in which the small end of the last convolutions, 100, of the generally helicoidal baffle, 101, extends within the exhaust pipe or conduit, 102. If preferred, it may be arranged to register with and abut the pipe, 102.

Figure 14:
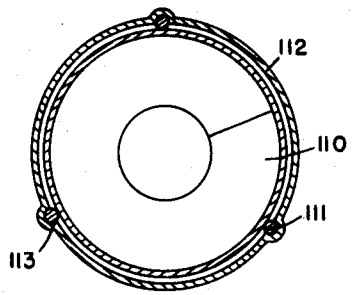
Figure 14 is a transverse section illustrating a further modified construction.

To facilitate assembly, it is sometimes desirable to pre-assemble the helicoidal member in a spider, and such a construction is shown in Figure 14, where the baffle, 110, is shown as secured to a spider, 111. The casing, 112, may, if desired, be formed with internal grooves, 113, for guidingly receiving the spider elements, 111. It will be understood that the spider, while illustrated as formed of round stock, may of course be formed of other shaped stock, such as bars or flat stock.

Figure 15:
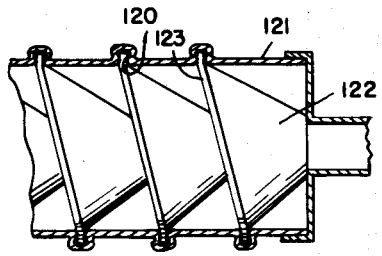
Figure 15 is a fragmentary elevation, partly in section, of a further modified construction.

Figure 15 illustrates a modified construction in which thread-like internal grooves, 120, are formed in the casing, 121. Baffle, 122, is formed with a flange, 123, which threads within the grooves, 120, in assembly. The walls of the grooves, 120, may then be crimped, or otherwise fastened, to lock the flange, 123, in place.

The construction may be varied in details, and in fact it is ordinarily necessary to modify the design in accordance with the particular conditions encountered. In order that the invention may be fully understood, specific examples of constructoin which have proved satisfactory in actual practice will be described.

A series of mufflers was constructed for a six-cylinder automobile. In making these mufflers, a series of four cylinders, each 5" in diameter and 36" long, were fabricated on the stove-pipe principle. These were made of 22-gauge metal of cold rolled sheets, one of these cylinders was covered with a 26-gauge sheet metal so as to form a double wall for the cylinder.

The inside functional members were formed of endless cones of helicoidal shape. In order to form these cones at different pitches and heights, strips were cut out of 24-gauge or 26-gauge metal having the shape of an empirical logarithmic spiral and having the general mathematical formula of $$C = \sqrt[z]{ae^{\alpha \theta}}$$

The mode of construction of this device in accordance with this formula is strikingly analogous to the design and formation of the stomach of a shark or other Elasmobranchii. In one muffler $x$ represented 5; in another, 5½; in another, 6; in another, 6½. Theta was used from zero to 900°. Alpha was used as unit of inches. In the formula $a$ was used as a constant and $e$ in the formula was the base of the natural logarithm. Rho represented the vector radius. This is illustrated in Figure 9, showing the sheet metal member, 79, formed in accordance with the foregoing.

Each spiral strip was rolled to form a multiple layer truncated cone. In some cases the cone was rolled from the inside; that is, with theta equaling zero; in other cases the cone was formed starting from the point where theta equals 900°. In each case the sequence of cones was different as to pitches and heights. The former method produced cones in which the sequence commenced with short cones and steep pitch. Such a muffler constructed by these cones offered greater resistance to exhaust gases and produced somewhat higher values in back pressure. The latter method produced cones in which the sequence commenced with cones of greater height and lesser slope, the range of slope of which varied between 15° to 35°. In this case the unrestricted central opening amounted to about ¼–⅛ of the overall diameter of the baffle. A muffler constructed of these cones offered less resistance to exhaust gases and the back pressure was at a minimum, for example, at 60 M. P. H. the back pressure was found to be about one-half pound per square inch; at 84 M. P. H. it was found to be about one and three-fourths pound per square inch, which is substantially better than the performance of conventional mufflers.

To house the above described functional inner member or baffle, I constructed for each muffler, a spider of ⅛ x ½ inch strip metal to fit into the previously formed 5" cylinder. The truncated cone was pulled apart so as to form a series of endless generally cone-shaped portions so shaped that the apex of one cone fell within the base of the succeeding cone. This series of cones was inserted into the spider and each cone was welded to the sides of the spider.

The completed spider, with the cones welded thereto, was then inserted into the respective cylinders. The side walls of the spider in each instance were welded to the sides of its respective cylinder.

Both ends of the respective cylinders were sealed by welding caps thereto with adaptor tubes at each end having a diameter or 2" at the inside at the exhaust end, and a diameter of 1¾" on the inside at the inlet end.

These four mufflers, which differ as pointed out above in the selection of different values of $x$ in the formula, were installed in turn and the performance checked under actual operating conditions over a period of time. Under the conditions tested it was found that the muffler constructed where $x$ was equal to 5½ performed most satisfactorily, although all of the mufflers performed in a satisfactory manner and in a manner superior to the performance of conventional mufflers.

While for the particular engine, this value of $x$ was found to be desirable, it will be appreciated that this is merely a specific example. Engines vary materially both in design and function, and in each case it will be desirable to design a muffler adapted to suit the conditions encountered. Variation in design for different conditions will effect not only the design of a stamping from sheet metal, as described above, but also structural design of the muffler, including design consideration, such as slope of the baffle, spacing of its convolutions, and the relative opening, if any, at their apexes. While no one specific muffler can be designed to take care of all eventualities, nevertheless, mufflers designed in accordance with the present invention are suitable for a wider range of conditions than are conventional mufflers. Accordingly, then, the value of $x$ and its constants $a$ and $\alpha$ might have any positive values of great variation; as for example $x$ was tried when equal from 1 to 12.

Figure 12:
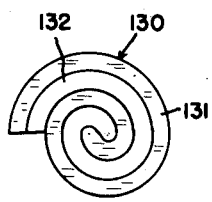
Figure 12 is a diagram indicating another method of making a modified baffle.

A further test was made in which the baffle member was formed by a method illustrated in Figure 12.

In this figure I have indicated at 130 a piece of sheet metal stamped or otherwise cut in accordance with a well known formula to produce a Fermat empirical spiral. In this figure I have shaded a portion, 131, and left unshaded a second portion, 132. Each of these portions, 131 and 132, may be employed as the baffle member.

Figure 16:
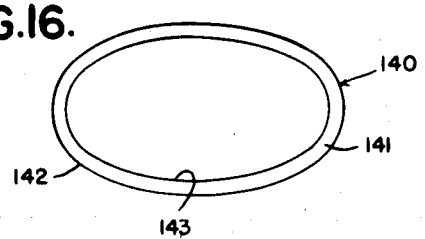
Figure 16 is a diagram indicating another method of making a modified baffle.

In Figure 16 I have illustrated yet another method of forming the baffle member. In this figure I have indicated generally at 140 a piece of sheet metal cut or otherwise stamped to form a strip of metal, 141, which is defined by two ellipses, 142 and 143. This construction was tested out in accordance with the following:

Two pieces of 26-gauge sheet metal was cut 36" long and 16" wide and formed into a 5" round cylinder, 36" long. A 26-gauge sheet metal blank was then cut to an elliptical shape having an $x$ axis of 40" and a $y$ axis of about 22". The strip formed was a section of about 6⅝" in width and followed the curve of the ellipse from one axis point to the opposite axis point, constituting a half section of an ellipse. This strip was rolled into the shape of a truncated cone which was then pulled out so as to form a series of endless cones, so shaped that the apex of one cone fell within the base of the succeeding cone.

The baffle member thus formed was inserted into the above described cylinder and fastened to the inner wall of the cylinder as follows:

The base of the first cone was spot welded to the inner wall of the cylinder, then each succeeding cone was fastened within the cylinder and then welding the base of each cone to the inner wall and welding it thereto. The apex of the last cone was converged into the receiving tube of the end cap and fastened thereto.

The muffler made in accordance with the foregoing was then installed on an automobile and then tested under service conditions. It was found that the muffler performed its muffling function in an entirely satisfactory manner and that the engine of the car appeared to have better performance and more power.

Instead of forming the helicoidal baffle so that its external envelope is cylindrical, excellent results are also obtained where it is formed so that its external envelope is an ellipse, and in Figure 10 I have illustrated in cross section the outline of a baffle, 80, having a central opening, 81, formed so that its envelope is an ellipse. In practice is is sometimes desirable to include two or more helicoidal baffle members within a single casing, especially if the casing is not of cylindrical shape, such as in elliptical or square casings, and in Figure 11 I have indicated the arrangement in which a casing 90, contains a pair of cylindrical helicoidal baffles, 91 and 92. In this case, an envelope or casing, 90, assumes the shape of two semi-cylindrical portions, 93, adapted to engage the cylindrical helicoidal baffles and interconnecting straight portions, 94.

Instead of employing a pair of helicoidal baffle members, three or more may be employed as will be obvious. Furthermore, the functional elements may be arranged in parallel or in series as desired. Ordinarily the number of muffler elements and their arrangement is dictated primarily by the space available. Thus, for example, if the space available is short, a plurality of elements either in parallel or in series may be employed.

I have referred herein to "a series of endless cones" or "a general helicoidal member." It is believed that the precise shape of this element is apparent from the disclosure. It is appreciated that in the completed article the baffle member is not, strictly speaking, conical, nor necessarily, helicoidal, but these terms appear to describe it well.

As indicated in the foregoing, the succeeding convolutions of the baffle members are not necessarily arranged so that their outer periphery extends at a constant lead. Accordingly these members may not be strictly true helicoids, but they most nearly approach helicoids and are accordingly herein designated as generally helicoidal. The term "helical-conical," which is self-explanatory in view of the disclosure, is also used.

The illustrated embodiments of my invention all show a central opening extending axially through the baffle. It is to be understood that the generally helicoidal baffle may be designed and/or assembled so that this central opening is not present, and the path for the gages is limited to a generally helical path; or the succeeding central openings follow along an undulating axis.

While I have illustrated a limited number of different embodiments of my invention and have illustrated and described the same as applied to a muffler, it will be understood that this has been done solely to disclose fully the invention, the scope of which is indicated by the appended claims.

What I claim as my invention is:

1. A device of the character described comprising an elongated casing having an inlet opening at one end and an outlet opening at the other end, and a member in said casing having an inclined surface sloping inwardly and toward the exhaust end of said casing, the said surface being also generally helically inclined to the axis of said casing.

2. A device of the character described comprising an elongated casing having an inlet opening at one end and an outlet opening at the other end, and a member in said casing having an inclined surface sloping inwardly and toward the exhaust end of said casing, the said surface being also generally helically inclined to the axis of said casing, the free inner edge of said member being reinforced.

3. A device of the character described comprising an elongated casing having an inlet opening at one end and an outlet opening at the other end, and a generally helicoidal member in said casing of helical-conical shape presenting surfaces inclined inwardly and toward the outlet end of said casing.

4. A device of the character described comprising an elongated casing having an inlet opening at one end and an outlet opening at the other end, and a generally helicoidal member in said casing of helical-conical shape presenting surfaces inclined inwardly and toward the outlet end of said casing, said surfaces of each convolution thereof extending inwardly substantially to the axis of said convolution.

5. A device of the character described comprising an elongated casing having an inlet opening at one end and an outlet opening at the other end, and a generally helicoidal member extending inwardly from the inner side of said casing to a point short of the axis of said casing whereby to leave a relatively unrestricted central opening therethrough, said member being a helically wound strip with its transverse surface inclined inwardly toward the said outlet opening.

6. A device of the character described comprising an elongated casing having an inlet opening at one end an outlet opening at the other end, and a generally helicoidal member extending inwardly from the inner side of said casing to a point short of the axis of said casing whereby to leave a relatively unrestricted central opening therethrough, said member being a modified helically wound strip with its transverse surface inclined inwardly toward the said outlet opening.

7. A device of the character described comprising an elongated casing having an inlet opening at one end and an outlet opening at the other end, and a generally helicoidal member extending inwardly from the inner side of said casing to a point short of the axis of said casing whereby to leave a relatively unrestricted central opening therethrough, said member being a corrugated helically wound strip with its transverse surface inclined inwardly toward the said outlet opening.

8. A device of the character described comprising an elongated casing having an inlet opening at one end and an outlet opening at the other end, and a generally helicoidal member extending inwardly from the inner side of said casing to a point short of the axis of said casing whereby to leave a relatively unrestricted central opening therethrough, said member being a helically wound strip with its transverse surface inclined inwardly toward the said outlet to form an angle of between 15° and 75° with the axis of the casing.

9. A device of the character described comprising an elongated casing having an inlet opening at one end and an outlet opening at the other end, and a generally helicoidal member extending inwardly from the inner side of said casing to a point short of the axis of said casing whereby to leave a relatively unrestricted central opening therethrough, said member being a helically wound strip with its transverse surface inclined inwardly toward the said outlet opening, the inner edge of said strip overlapping the adjacent convolution of said strip.

10. A device of the character described comprising an elongated casing having an inlet opening at one end and outlet opening at the other end, and a generally helicoidal member extending inwardly from the inner side of said casing whereby to leave a relatively unrestricted central opening therethrough, said member being a helically wound strip with its transverse surface inclined inwardly toward the said outlet opening, the said inclination of adjacent convolutions of said strip varying from one end of said strip to the other.

11. A device of the character described comprising a casing having internal, radially extending portions arranged in a helical path and forming an internal thread, a generally helicoidal baffle having radially outwardly projecting portions forming an external thread, said baffle being threaded into said casing.

12. A device of the character described comprising a casing having a plurality of spaced, radially inwardly projecting portions arranged in a helical path and forming an interrupted, internal thread, a generally helicoidal baffle having radially outwardly projecting portions forming an external thread, said baffle being threaded into said casing.

13. A helicoidal baffle comprising a helically wound strip having the transverse surface of said strip inclined to the axis of said baffle, said strip having a lateral external flange adapted to connect adjacent convolutions, said flange being secured directly to said adjacent convolution to form an envelope for said baffle.

14. A device of the character described comprising an elongated casing having an inlet opening at one end and an outlet opening at the other end, a generally helical strip in said casing extending longitudinally for the major portion thereof, the outer edge of said strip being in substantial proximity to the inner wall of said casing, the other edge of said strip being adjacent to but spaced from the axis of said casing, thereby defining a central, unrestricted passage through said casing, said strip being inclined in its transverse dimension from the said outer edge to the said inner edge in a direction inwardly of said casing and toward the outlet end thereof.

15. A device of the character described comprising an elongated cylindrical casing having an inlet opening at one end and an outlet opening at the other end, a generally helical strip in said casing extending longitudinally for the major portion thereof, the outer edge of said strip being in substantial proximity to the inner wall of said casing, the other edge of said strip being adjacent to but spaced from the axis of said casing, thereby defining a central, unrestricted passage through said casing, said strip being inclined in its transverse dimension from the said outer edge to the said inner edge in a direction inwardly of said casing and toward the outlet end thereof.

16. A device of the character described comprising an elongated cylindrical casing having an inlet opening at one end and an outlet opening at the other end, a generally helical strip in said casing extending longitudinally for the major portion thereof, the outer edge of said strip being in substantial proximity to the inner wall of said casing, the other edge of said strip being adjacent to but spaced from the axis of said casing, thereby defining a central, unrestricted passage through said casing, said strip being inclined in its transverse dimension from the said outer edge in a direction inwardly of said casing and toward the outlet end thereof, said strip being essentially a helically wound, flat strip.

MICHAEL W. FREEMAN.